United States Patent
Royer et al.

(10) Patent No.: US 7,058,264 B2
(45) Date of Patent: Jun. 6, 2006

(54) OPTICAL FIBRES PROVIDED WITH A LENS BY PHOTOPOLYMERIZATION AND RELATED NOVEL OPTICAL COMPONENTS

(75) Inventors: Pascal Royer, Troyes (FR); Renaud Bachelot, Saint Andre les Vergers (FR); Carole Ecoffet, Mulhouse (FR); Daniel-Joseph Lougnot, Chavannes les Grands (FR)

(73) Assignee: Universite de Technologie de Troyes, Troyes (FR)

( * ) Notice: Subject to any disclaimer, the term of this patent is extended or adjusted under 35 U.S.C. 154(b) by 0 days.

(21) Appl. No.: 10/484,918

(22) PCT Filed: Jul. 26, 2002

(86) PCT No.: PCT/FR02/02678

§ 371 (c)(1), (2), (4) Date: Aug. 27, 2004

(87) PCT Pub. No.: WO03/012504

PCT Pub. Date: Feb. 13, 2003

(65) Prior Publication Data
US 2004/0264860 A1 Dec. 30, 2004

(30) Foreign Application Priority Data
Jul. 27, 2001 (FR) .................................. 01 10147

(51) Int. Cl.
*G02B 6/26* (2006.01)
(52) U.S. Cl. ........................ 385/38; 385/27; 385/33; 385/34; 385/43; 385/51
(58) Field of Classification Search ............... 385/33, 385/31–32, 34–35, 88, 92–93, 139, 38, 27, 385/43, 51; 428/216
See application file for complete search history.

(56) References Cited

U.S. PATENT DOCUMENTS 4,181,766 A * 1/1980 Williams et al. ............ 428/216

(Continued)

FOREIGN PATENT DOCUMENTS

EP        0 801 318 A     10/1997

(Continued)

OTHER PUBLICATIONS

Cohen, L.G. et al.: "Microlenses for Coupling Junction Lasers to Optical Fibers", Applied Optics, Optical Society of America, Wash., DC, vol. 13, No. 1, 1974, pp. 89-94, XP002022522, ISSN: 0003-6935, p. 89, righthand col., p. 901, lefthand col., fig. 4.

(Continued)

*Primary Examiner*—Frank G. Font
*Assistant Examiner*—Michael P. Mooney
(74) *Attorney, Agent, or Firm*—Miles & Stockbridge P.C.; Edward J. Kondracki (57) ABSTRACT

The invention concerns monomode or multimode optical fibers provided with a lens with an end taper, obtained by selective photopolymerization of a formulation, and with improved performances through the use of novel parameters and technical processes enabling production of polymer tapers with optimized characteristic required for a wide range of applications. The monomode or multimode optical fibers can, for certain specific applications, be equipped with a metallized polymer taper except for a nanometric opening for sensing or emitting light or a polymer taper whereof the formulation contains fluorescent particles. The novel fibers are essential components in various fields such as telecommunications (high performance connectors) or instrumentation (optical radiation comparator probes for scanning optical microscopy and near-field optical microscopy).

33 Claims, 6 Drawing Sheets

U.S. PATENT DOCUMENTS

| | | | |
|---|---|---|---|
| 4,877,717 A | 10/1989 | Suzuki et al. | |
| 5,430,813 A | 7/1995 | Anderson et al. | |
| 5,498,444 A | 3/1996 | Hayes | |
| 5,627,922 A * | 5/1997 | Kopelman et al. | 385/12 |
| 5,789,742 A | 8/1998 | Wolff | |
| 6,625,351 B1 * | 9/2003 | Cox et al. | 385/33 |

FOREIGN PATENT DOCUMENTS

| | | | |
|---|---|---|---|
| FR | 2734914 A | | 12/1996 |
| FR | 2798740 | * | 3/2001 |
| FR | 2798740 A | | 3/2001 |

OTHER PUBLICATIONS

Bear, P.D.: "Microlenses for Couplling Single-mode Fibers to Single-mode Thin-Film Waveguides", Applied Optics, Optical Soc. Of America, Wash., DC, vol. 19, No. 17, Sep. 1980, pp. 2906-2904, XP002117843, ISSN: 0003-6935.

* cited by examiner

OPTICAL FIBRES PROVIDED WITH A LENS BY PHOTOPOLYMERIZATION AND RELATED NOVEL OPTICAL COMPONENTS

BACKGROUND OF THE INVENTION

This invention relates to lens-ended optical fibers, for which the first embodiments and applications by the inventors were described in a previous invention patent application issued by the INPI under No. 98 14385 entitled "New Lens Optical Fibers With A Large Application Digital Opening for Manufacture of New High Quality Optoelectronic Components".

Lens-ended optical fibers equipped at their ends with transparent polymer micro-tips, enable very much improved optical connections between the optical fibers themselves and between optical fibers and active or passive components connected to them. The result is that it becomes possible to make complex high performances devices.

However, the optical characteristics required by the various designers are becoming more and more remarkable while applications, now frequently in a worldwide market, are developing quickly and require the development of new technologies in many optics fields.

BRIEF SUMMARY OF THE INVENTION

The general purposes of this invention are, non-limitatively, the use of new technological parameters and processes to create polymer micro-tips with general characteristics optimised for the case of applications with monomode and multimode optical fibers, and the corresponding development of new particularly innovative devices searched for by users.

The invention will be better understood after reading the following description in the light of the figures which illustrate the invention and application thereof.

Figure 1:
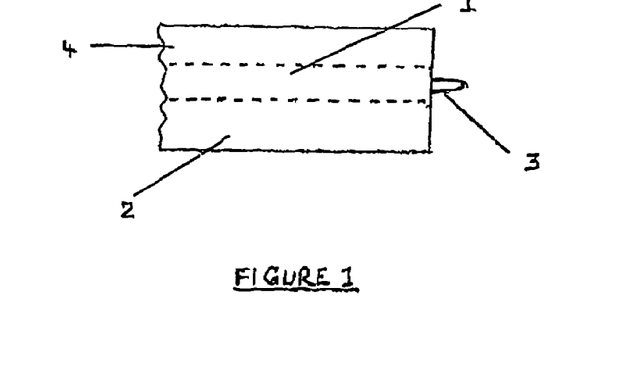
FIG. 1 depicts a micro-tipped fiber made in accordance with the present invention.

FIG. 1 shows the end of an optical fiber 4 comprising a core 1 and a duct 2 equipped with a polymer micro-tip 3 made using a Photopolymerisable resin type material, for which the dimensions and geometry may be adjusted by optimising new physicochemical parameters, for example as a function of envisaged applications.

According to a first purpose of the invention, the operational process used to make the micro-tips gives excellent diversity in values of the height (from a few microns to a few hundred microns) and the radius of curvature of the drop deposited at the beginning of the process. The result is that the dimensions of the micro-tip that depend directly on the dimensions of the formulation drop can be precisely controlled depending on the required applications.

Figure 2:
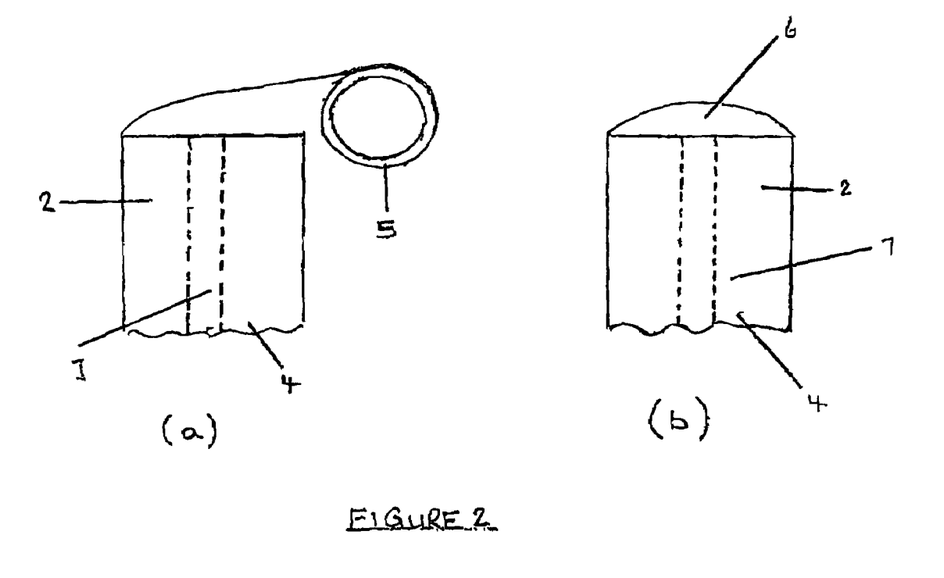
FIGS. 2(a)–2(b) depict a micro-tip production operation in accordance with the present invention.

The first micro-tip production operation which is shown as an example in FIG. 2, consists of depositing a formulation drop as shown in FIG. 2a using a pipette 5, at the end of a cleaved fiber 4 instantaneously forming a capillarity meniscus 6 for which the heights and radii of curvature of the formulation drop are directly related to the diameter of the fiber and to surface tensions (capillarity), as can be seen in FIG. 2b. These values depend essentially on the viscosity of the formulation used. The viscosity parameter takes an overriding importance for the first objective of the invention. According to the invention, the chemical composition of the formulation is firstly adapted to the required viscosity value, but the formulation temperature also plays a very important role.

Thus, the height of the deposited drop will be reduced by slightly heating the formulation which will make it less viscous. Conversely, the deposited drop will be cooled in advance to make the formulation more viscous and to obtain a larger drop height. For example, a variation of the resin temperature making up the formulation between 10° C. and 65° C. will result in drops with a height of between 10 and 50 microns.

In general, it was specified in the text of the first industrial protection deposited by the inventors that the photopolymerisable formulation is a means of making the micro-tip at the end of the fiber behave like a liquid material sensitive to green light and composed of photoinitiators (eosine+MDEA) and a monomer (PETIA).

According to improvements according to our invention, photoinitiators can be modified so that the formulation is sensitive to wave lengths longer than the wave length for green light, namely red light, near infrared light and more precisely to wave lengths frequently used in the field of telecommunications (for example 1.3 and 1.55 μm).

According to another aspect of the first purpose of the invention, the surface tensions that are directly related to the viscosity of the formulation can also be modified by applying a preliminary treatment to the fiber before the drop is deposited. Preferably (but not limitatively) this treatment consists of dipping the cleaved optical fiber into sulfochromic acid for 24 hours. The surface of the fiber is made hydrophilic, and the attenuated capillarity phenomenon results in a small drop height (for example 10 microns).

The final width of the micro-tip depends on the diameter of the fiber core that guides almost all of the light (usually green light) to the end of the fiber at which the formulation drop was deposited.

The light exposure conditions, and particularly the value of polymerising light intensity and its application time, are also important parameters that should be adjusted as a function of needs.

The final radius of curvature of the micro-tip to be made is much smaller than the radius of curvature of the drop, and is an important factor in obtaining the lens-ended characteristics required for the micro-tip. This radius of curvature may be adjusted as a function of the exposure time (0.5 to 90 seconds as a non-limitative example) and the intensity of photopolymerising light injected into the fiber (fiber output current from 1 to 100 μwatts, as a non-limitative example).

The radius of curvature of the micro-tip also depends on oxygen effects at the drop/air interface. According to the invention, oxygen effects are controlled by adjusting the air composition close to the operational field. Non-limitatively, nitrogen can be injected into a glove box type sealed compartment in which the end of the fiber is inserted.

According to this first purpose of the invention, the operational process and the various micro-tip parameters concerned are not only optimised in order to have good control over production of the various micro-tips and their required characteristics in the many possible applications, but also with the objective of developing a simple and inexpensive manufacturing process capable of "mass production" of fiber end micro-tips.

According to a non-limitative aspect of the first purpose of the invention, the laser radiation necessary for photopolymerisation is distributed into a large number of optical fibers that will be equipped with an end micro-tip, after broadening and homogenisation of the light beam by known optical processes.

The optical power necessary for photopolymerisation is only a few microwatts per micro-tip, consequently "mass production" of more than 100 micro-tips simultaneously (non-limitative example) would be possible according to our invention.

Figure 3:
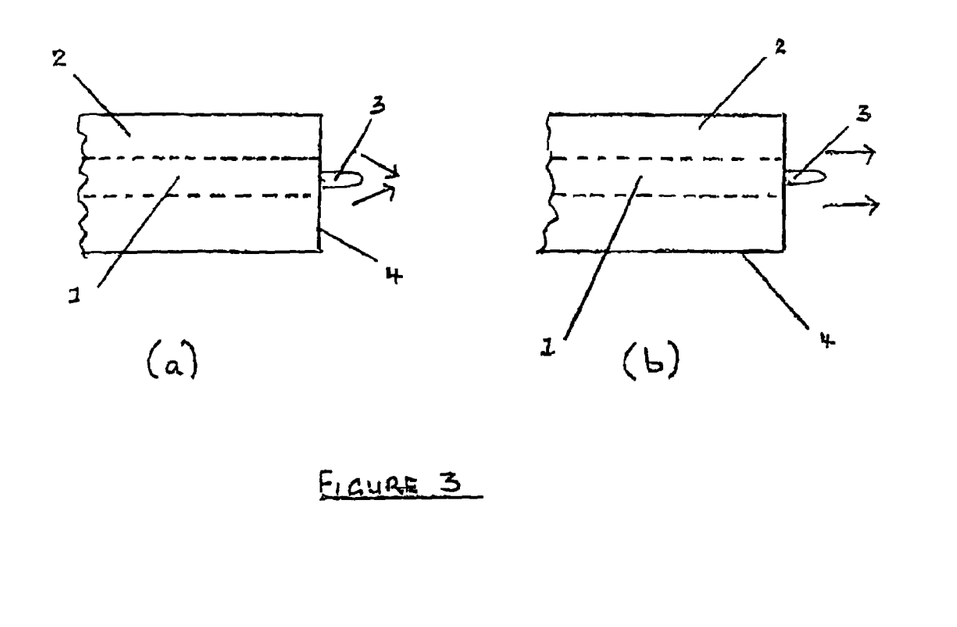
FIGS. 3(a)–3(b) relate to improved processes in accordance with the present invention.

According to a second purpose of the invention and in accordance with FIG. 3, essential aspects of previous technologies and processes improved according to the first purpose of the invention, are applied to multimode and monomode fibers to make fibrous compounds providing a beam that can be either focused (FIG. 3a) or collimated (FIG. 3b).

In the special case of multimode fibers, incident light initialising polymerisation preferably originates from a source external to the multimode fiber associated with shaping components of the beam output by the source.

Photopolymerisation is then done without any longitudinal propagation of polymerising light in the multimode fiber itself. The result is thus to avoid illuminating the formulation with all the various transverse modes propagating in multimode fibers when the photopolymerising light is injected at the end of the fibers.

In this case, the geometry of the micro lens produced is similar to the geometry of the formulation drop that was previously deposited.

According to other aspects of the second purpose of the invention, and when some applications make it necessary for the geometry of the micro-tip to be independent of the current distribution between fiber modes, the polymer micro-tip can be made by coupling a white light source to the other end of the fiber outputting incoherent light chosen such that the spectrum of transmitted wave lengths is compatible with the various modes that could be propagated in the fiber. Also in the case of some applications that require compact installations in which it is difficult to envisage the presence of a monochromatic light source close to the end of the usually multimode fiber and therefore the micro-tip to be made, either for location reasons or more generally due to a complex arrangement of the micro-tip production equipment as a whole, the photopolymerising light source used is also non-limitatively an incoherent white light source.

According to a third purpose of the invention, the various improvements made described in the first and second purposes of the invention and associated with the corresponding detailed knowledge of micro-tip properties as a function of the conditions for their production and general techniques for the connection of optical elements, were developed and are applicable for many applications.

The main connection types according to the invention and given non-limitatively are shown in the following figures.

Figure 4:
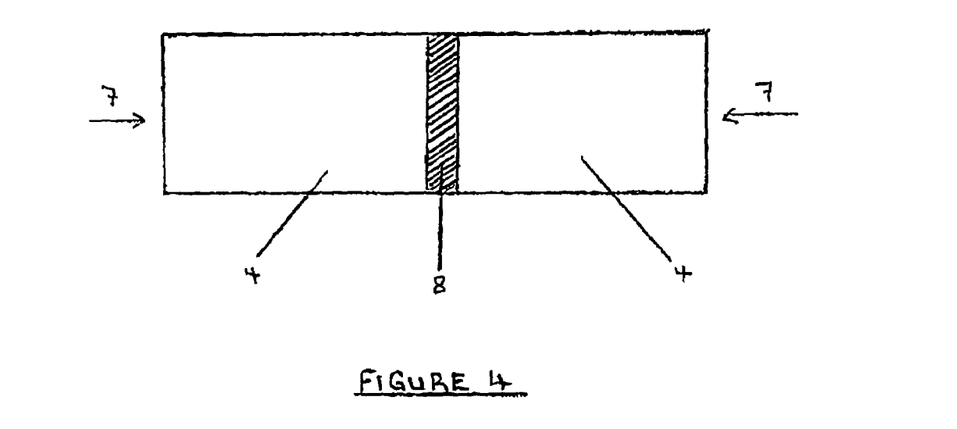
FIG. 4 shows a type of monomode or multimode fiber-to-fiber connection.

FIG. 4 shows a type of monomode or multimode fiber-to-fiber connection.

The photopolymerising light 7 is injected into the ends of two fibers 4 to be connected and aligned. The contact between the fibers is made by a polymer formulation in the form of a film 8 made using the same technological process claimed for making the micro-tips. The result is a "cold" solder together with an optical jacket such as glue with an index less than the index of the film, and by a mechanical protective jacket. The insertion losses of such a connection may be as low as 0.1 db.

Figure 5:
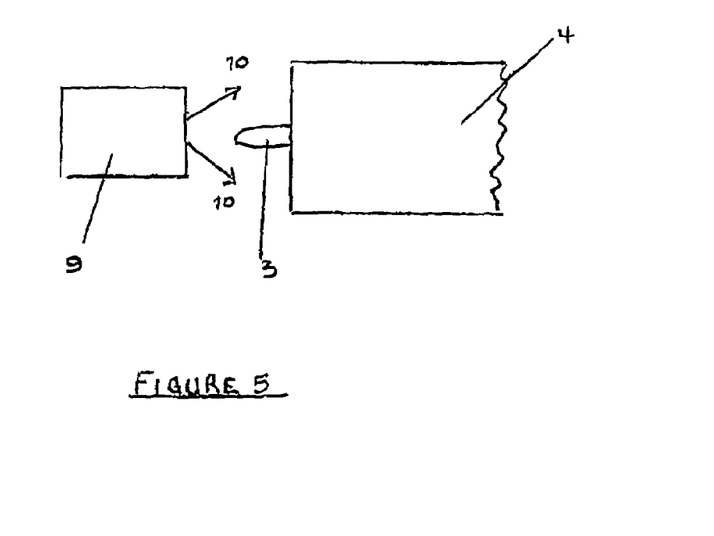
FIG. 5 diagrammatically shows a laser diode to an optical fiber type connection.

FIG. 5 diagrammatically shows a laser diode 9 to an optical fiber 4 type connection.

In this type of connection, the micro-tip 3 made at the end of the fiber 4 is sized such that the coupling between the radiation from the laser 10 and the micro-tip 3 is maximum.

The connections shown in FIGS. 4 and 5 are only given as examples and are therefore non-exhaustive.

In the context of this third purpose of the invention, integrated optical wave guides, for example, can be connected using the same simple technologies described above, despite the number and complexity of optoelectronic circuits included in them.

According to a fourth purpose of the invention, micro-tips are made at the ends of multimode fibers capable of propagating one or several modes only.

Before exposure of the formulation drop to light, the required mode(s) is (are) selected by applying mechanical stresses to the multimode fiber and modifying the conditions of injection of green light until the required mode(s) is (are) obtained.

Figure 6:
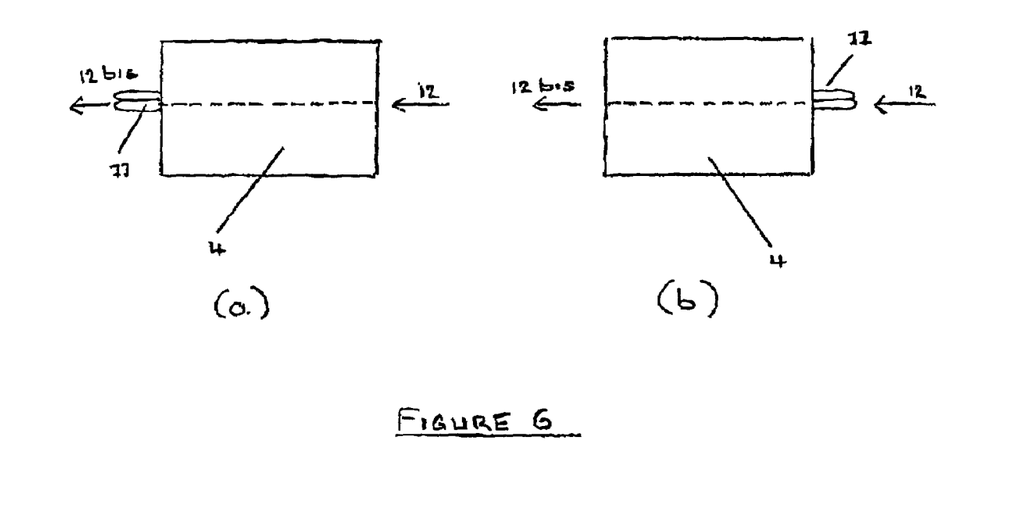
FIGS. 6(a)–6(b) show aspects of micro-tip device in accordance with the present invention.
Figure 7:
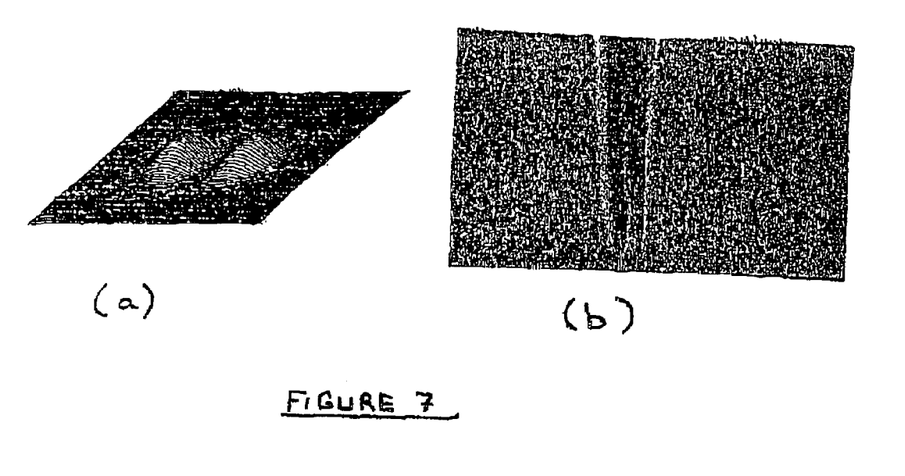
FIGS. 7(a)–7(b) show aspects the micro-tip device as it relates to intensity distribution in accordance with the present invention.

As an example shown in FIG. 6, a double polymer micro-tip 11, which is made (FIG. 6a) on a fiber with a 9 micron core, only transmits mode LP 11 of fiber 4, starting from radiation 12. The intensity distribution 12 bis transmitted by the double micro-tip 11 is shown in FIG. 7a, which is the same intensity distribution used to create the double micro-tip 11. FIG. 7b shows the double micro-tip polymer element after its manufacture.

Conversely, the polymer micro-tip 11 can be used as "input" to a fiber illuminated by an incident light beam 12 (FIG. 6b), light energy is transmitted by micro-tip 11 in the multimode fiber according to a spatial distribution corresponding to the LP mode 11 in the example chosen. Only the LP mode 11 is excited in the fiber, regardless of the injection conditions in the fiber.

Figure 8:
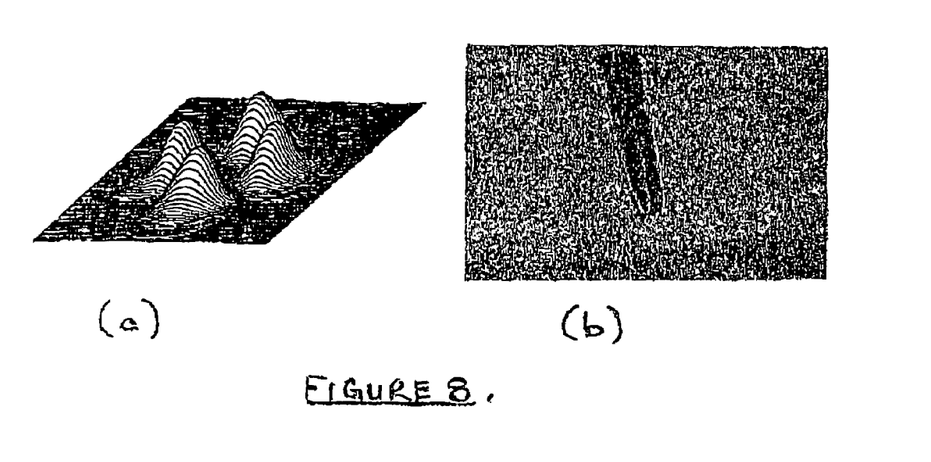
FIGS. 8(a)–8(b) show aspects the micro-tip device as it relates to intensity distribution in accordance with the present invention in another embodiment.

According to another example embodiment, a polymer multi-micro-tip was made that can be used to select the LP mode 21 on a multimode fiber with a core diameter of 9 microns. The intensity distribution at the output from the fiber in which the light 12a was injected by the micro-tip according to LP mode 21 is shown in FIG. 8a. FIG. 8b shows the polymer element with 4 micro-tips after manufacturing.

Thus according to our invention, it is possible to make "Transverse mode filters" and more generally new devices called "Mode selectors".

According to a fifth purpose of the invention, the new lens-ended optical fibers optimised according to the invention are used as optical radiation measurement probes with an excellent resolution better than 1 micron.

Figure 9:
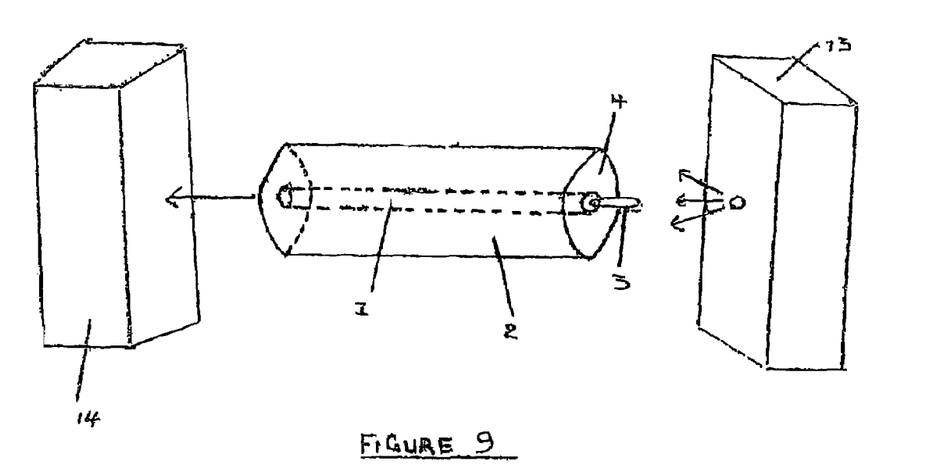
FIG. 9 diagrammatically shows a device according to the invention for measuring energy.

As an example of the use of these new probes, FIG. 9 diagrammatically shows a device according to the invention for measuring energy emitted by a laser 13 and particularly the configuration of the optical field curves at the output from the laser.

The laser 13 used in the experiment is a laser diode marketed by the SHARP Company with a 200 µm wide active layer.

The end of the lens-ended optical fiber 4 fitted with its micro-tip 3 is moved successively along 3 planes at distances of 2.5 µm, 1 µm and 0.1 µm respectively from the diode.

The other end of the non lens-ended fiber 4 is connected to a photomultiplier 14, increasing the measurement sensitivity.

Figure 10:
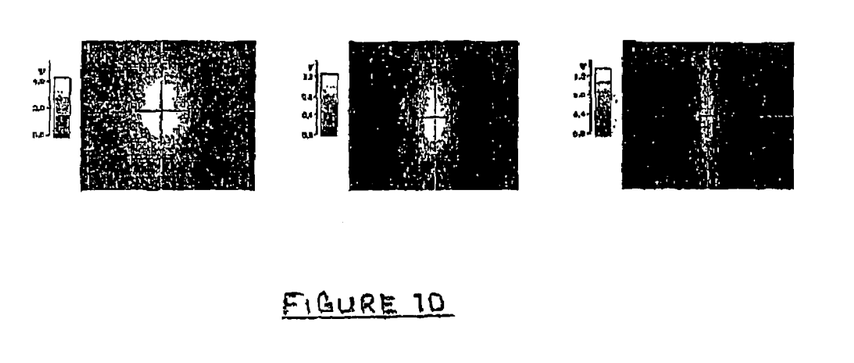
FIG. 10 shows optical radiation images of the laser diode recorded at three distances.

FIG. 10 shows optical radiation images of the laser diode recorded at three distances (2.5, 1 and 0.1 µm), the lens-ended optical fiber being moved within an area of 8×8 µm$^2$. Note in FIG. 10 that as the distance from the micro-tip to the laser diode decreases, the active layer of the laser becomes more visible. Furthermore, a clear distinction can be seen between curves of progressively decreasing optical levels for a distance for example of 2.5 µm from the micro-tip to the surface of the fiber 4.

According to a sixth purpose of the invention, some optimisations of lens-ended optical fibers according to the invention are particularly aimed at applications of these fibers in microscopy and in the manufacture of the corresponding measurement probes.

Figure 11:
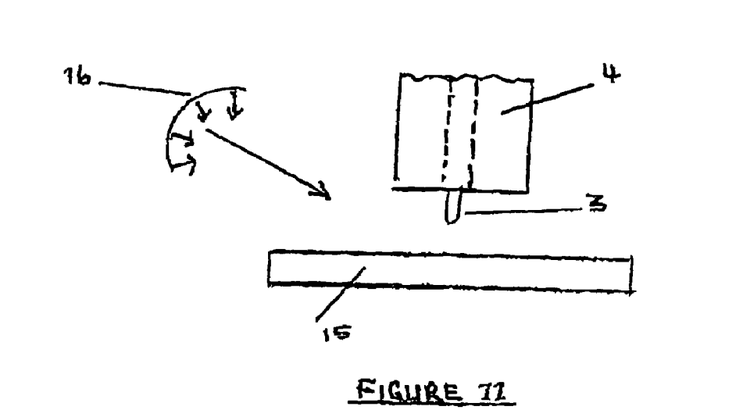
FIG. 11 shows a use of the new lens-ended fibers.

In the case of optical microscopy with conventional scanning, the new lens-ended optical fibers are used as shown in FIG. 11 as a measurement probe for light diffused by the surface of an object 15 illuminated by an external source 16. An optical image of the studied area can be produced by moving the lens-ended optical fiber above the object.

Thus, high resolution optical scanning microscopy can be done using a simple very low cost probe. Resolutions of 300 to 500 nm can easily be obtained.

Figure 12:
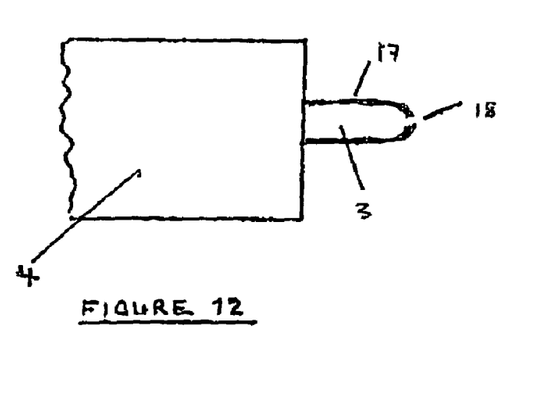
FIG. 12 shows a micro-tip that is metallised with the exception of an aperture.

In the case of optical microscopy applications in near field, the polymer micro-tip of a lens-ended fiber optimised according to the invention is fully metallised, as is shown in FIG. 12, except for a circular nano-aperture 18 formed in the metallisation 17, with a typical diameter of a few tens of nanometres. This nano-aperture remains capable of emitting or receiving light in optical microscopic experiments in the near field. This type of lens-ended fiber with a metallised micro-tip generally acts as a nano-source or a nano-collector, depending on the needs.

The nature of the metal used covering almost the entire micro-tip is preferably but not limitatively chromium or gold.

Figure 13:
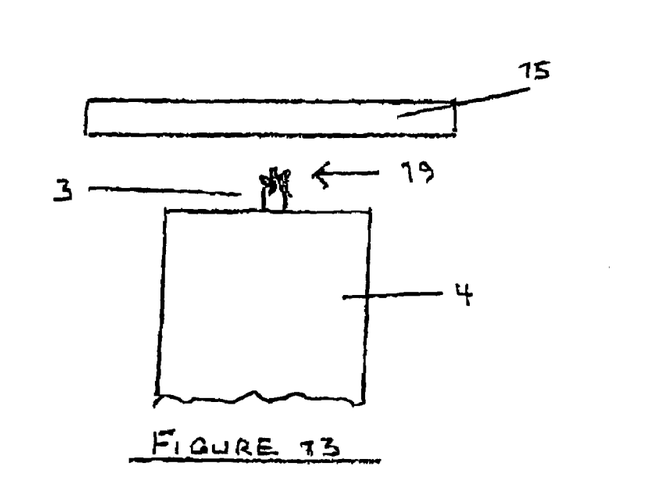
FIG. 13 shows a submicronic probe variant of the present invention.

According to one variant of a submicronic probe shown in FIG. 13, fluorescent particles 19 are included in the photo-polymerisable formulation in order to obtain a micro-tip end containing some particles for which the selective optical excitation improves the spatial resolution in optical microscopy. The size of the fluorescent particles added to the formulation is less than one micron. The particle concentration is adjusted to obtain one or several particles at the end of the micro-tip, after formation of the micro-tip. The fluorescence of the particles is then selectively excited through the fiber to obtain a localised light source 15 capable of probing the optical properties of a sample in the near field with a precision better than one micron.

Note that an apparently similar approach for producing probes with a resolution better than one micron in optical microscopy applications in the near field by particle integration, was recently validated by research workers J. MICHAELLS et al. However, the method used by these research workers is very complex, and moreover it is not certain that particle adhesion takes place at the ends of the probes.

The particle probe type according to one of the purposes of our invention enables the use of a much simpler and more reliable process.

For the sixth purpose of the invention, the metallised probes described above but without nano-apertures can be used as surface plasmon sensors. A monomode or multi-mode lens-ended optical fiber improved according to the invention is used.

The polymer micro-tip is coated with fine metallisation, preferably with gold or silver.

The characteristics of plasmons can be modified by varying the optical index of the external medium, by injecting light into the other cleaved end of the fiber and setting up conditions for excitation of surface plasmons at the metal-air interface. Thus, the presence of chemical or biological substances in contact with the metallic layer will cause modifications of the optical properties of plasmons, therefore variations of the light signal transmitted or reflected by the end of the fiber fitted with the metallised polymer micro-tip.

The invention claimed is:

1. A lens-ended optical fiber for propagating at least one mode comprising a polymer micro-tip at the end of the optical fiber, said polymer comprising a photopolymerisable resin and said micro-tip having a radius of curvature that is a function of intensity of injected photopolymerizing light and exposure time, said resin including polymerization photo initiators sensitive to red light and near infrared light wavelengths.

2. An optical fiber as set forth in claim 1 wherein said resin includes fluorescent particles which enable the micro-tip to act as a light source.

3. An optical fiber as set forth in claim 1, said micro-tip having a resolution greater than 1 micron so as to be adapted for use as an optical radiation measurement probe.

4. An optical fiber as set forth in claim 1 wherein said micro-tip has a metal coating.

5. An optical fiber as set forth in claim 4 wherein said metal coating includes a nano operture capable of receiving light in the domain of near field optical microscopy.

6. An optical fiber as set forth in claim 1 wherein the micro-tip is a thin film.

7. An optical fiber as set forth in claim 1 wherein said tip propagates one or more preset modes.

8. A method for producing single-mode or multimode optical fibers with lenses from a multimode or analog fiber by forming at least one end taper made of transparent polymer, comprising a step for depositing on at least one end of an optical fiber, in the form of a drop, a fluid mixture that includes a photopolymerizable base substance and at least one polymerization photoinitiator, followed by a step for exposing the deposited drop to a light source created to provide a photopolymerization light, subjecting a multimode fiber to at least one mechanical stress for selecting the desired mode, and checking and controlling the shape and the dimensions of the taper during said steps for depositing and exposing the drop to obtain a predetermined radius of curvature and taper height between several microns and several hundred microns, said method further including:

a step for conditioning the mixture at a predetermined temperature to give the mixture an adapted viscosity, making it possible to obtain a desired drop height prior to the exposure step; and a step for for adjusting the final radius of curvature of the taper by adjusting the exposure time and/or the intensity of the photopolymerization light.

9. A method for producing single-mode or multimode optical fibers with lenses according to claim 8, including a step for adjusting oxygen content in the air in the vicinity of the taper to adjust the final radius of curvature of the taper, and injecting nitrogen into an airtight compartment to control the effects of the oxygen in a drop/air interface on the radius of curvature of the taper.

10. A method for producing single-mode or multimode optical fibers with lenses according to claim 8, further comprising a step for pretreatment by acid dipping the end of the fibers to adjust the viscosity of the formulation linked to surface tensions for obtaining small drop heights.

11. A method for producing single-mode or multimode optical fibers with lenses according to claim 8, further comprising exposing the drop provided by a light source through the optical fiber.

12. A method for producing single-mode or multimode optical fibers with lenses according to claim 8, wherein the photopolymerization required for the formation of the tapers is derived from a source outside the multimode fiber that delivers the polymerization light to the immediate proximity of the taper, without injecting another light at the other end of the fibers that propagates longitudinally through the fibers.

13. A method for producing single-mode or multimode optical fibers with lenses according to claim 8, wherein the photopolymerization required for the formation of the tapers is derived by an incoherent white light source injected at the opposite end of the fiber from the taper.

14. A method for producing single-mode or multimode optical fibers with lenses according to claim 8, wherein the dimensions of the taper and the shape of the end of the taper provide focused or collimated beams.

15. A production method according to claim 8, wherein the dimensions and the shape of the tapers are adjusted for the production of wave-guide-to-wave-guide connectors, the photopolymerization light being injected during said exposure step at the ends of two guides to be connected so as to form a film of formulation of slight thickness that produces the contact between the wave guides.

16. A method for producing single-mode or multimode optical fibers with lenses according to claim 8, wherein the dimensions and the shape of the end of the tapers provide a maximum optical coupling between a fiber and a laser diode.

17. A method for producing single-mode or multimode optical fibers with lenses according to claim 8, wherein the fibers connect wave guides or complex multi-purpose optical integrated circuits, the tapers of each of the fibers used in the connectors being adjusted separately, as needed.

18. A method for producing single-mode or multimode optical fibers with lenses according to claim 8, wherein the optimized tapers are probes for measuring optical radiation to obtain a submicronic lateral spatial resolution for optical microscopy applications with high-resolution scanning.

19. A method for producing single-mode or multimode optical fibers with lenses according to claim 8 further comprising integrating fluorescent particles into the polymerizable formulation of the tapers, said particles acting, after photopolymerization, as a localized light source at the end of the tapers.

20. A method as set forth in claim 19 wherein the localized light source is constituted by at least one fluorescent particle, enough to probe the optical properties of a sample in a near field.

21. A method for producing single-mode or multimode optical fibers with lenses according to claim 18 wherein a metallic layer is deposited on the polymer taper, with the exception of an approximately circular nano-opening produced at the end of the taper.

22. A method for producing single-mode or multimode optical fibers with lenses according to claim 18 further comprising metallizing the taper by depositing a metallic layer on the polymer taper, the tapers thus metallized being adapted for use as surface plasmon sensors whose characteristics are adjusted by varying the optical index of the external medium in the presence of chemical or biological substances in contact with the metallization of the taper.

23. A method for producing single-mode or multimode optical fibers with lenses according to claim 8, wherein the polymerization photoinitiator of the formulation is sensitive to red and near-infrared wave lengths.

24. Single-mode or multimode optical fibers with lenses obtained by the method according to claim 8 and having in the tapers a photopolymerizable resin including polymerization photo initiators sensitive to red light and near infrared light wavelengths, wherein the chemical composition of the formulation of the tapers is first adapted to the value of a desired viscosity and predetermined height, between several microns and several hundred microns.

25. Single-mode or multimode optical fibers with lenses according to claim 24, wherein the tapers produced at the ends of fibers are designed so as to propagate only one or several modes selected in advance.

26. Single-mode or multimode optical fibers with lenses according to claim 24, wherein the tapers at the ends of fibers are metallized with the exception of a nano-opening capable of playing the role of a light nanosource or nanocollector in the field of near-field optical microscopy.

27. Single-mode or multimode optical fibers with lenses according to claim 24, wherein the tapers at the ends of fibers are metallized so as to form surface plasmon sensors.

28. A method for producing single-mode or multimode optical fibers with lenses according to claim 8 further comprising pretreating the end of the fibers by acid dipping in order to adjust the viscosity of the formulation linked to surface tensions, thus obtaining small drop heights, and delivering the polymerization light to the immediate proximity of the taper, without injecting another light at the other end of the fibers that propagates longitudinally through the fibers.

29. A method for producing single-mode or multimode optical fibers with lenses according to claim 28, wherein the photopolymerization required for the formation of the tapers is obtained by an incoherent white light source injected at the opposite end of the fiber from the taper.

30. A method for producing single-mode or multimode optical fibers with lenses according to claim 28 further comprising controlling the dimensions of the taper and the shape of the end of the taper to obtain focused or collimated beams.

31. A method for producing single-mode or multimode optical fibers with lenses according to claim 30 further comprising integrating fluorescent particles into the polymerizable formulation of the tapers, said particles acting, after photopolymerization, as a localized light source at the end of the tapers.

32. A method as set forth in claim 31 wherein the localized light source is constituted by at least one fluorescent particle, enough to probe the optical properties of a sample in a near field.

33. A method for producing single-mode or multimode optical fibers with lenses according to claim 30, wherein a metallic layer is deposited on the polymer taper, with the exception of an approximately circular nano-opening produced at the end of the taper.

* * * * *